April 9, 1946.   R. K. AKIN   2,397,907
ELECTRIC CIRCUIT CONTROLLER
Filed Oct. 19, 1942   2 Sheets-Sheet 1

Inventor
Richard K. Akin
By [signature]
Attorney

April 9, 1946.　　　　　R. K. AKIN　　　　　2,397,907
ELECTRIC CIRCUIT CONTROLLER
Filed Oct. 19, 1942　　　2 Sheets-Sheet 2
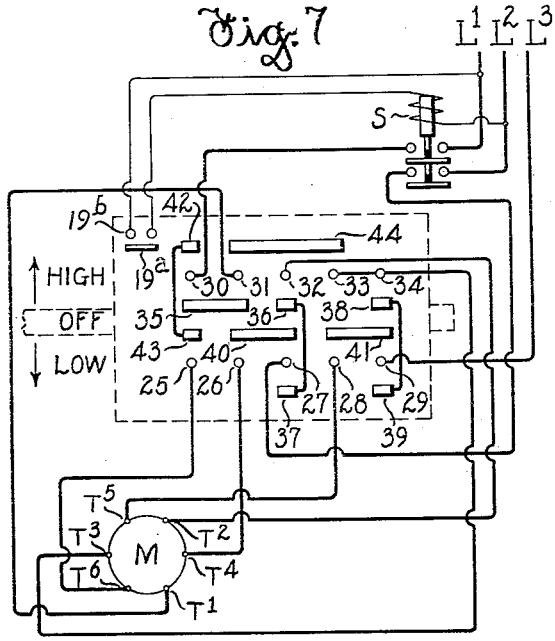
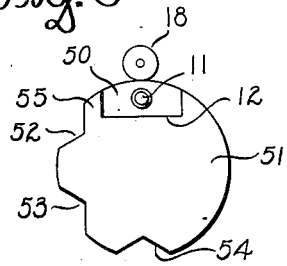
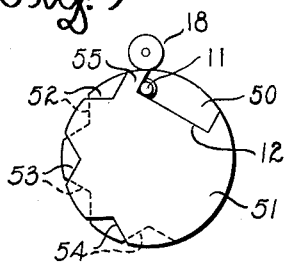
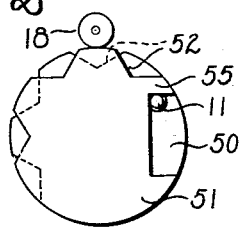
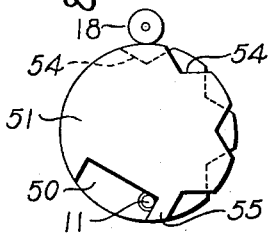
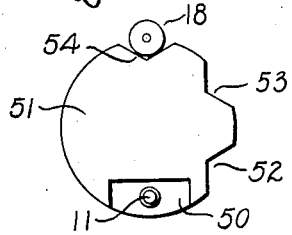
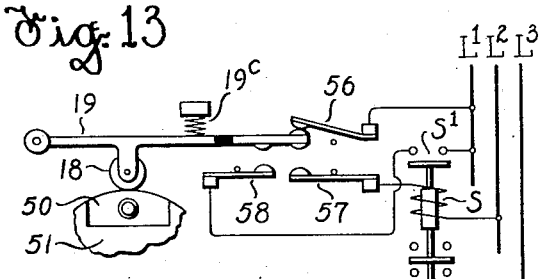
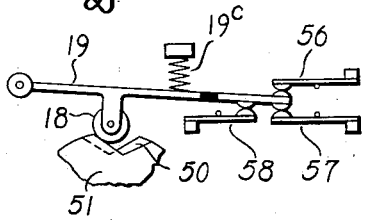
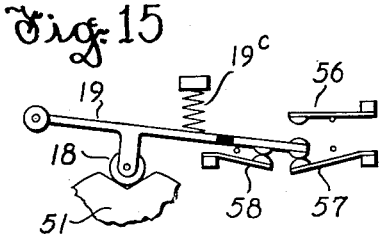
Inventor
Richard K. Akin
By Frank M. Hubbard
Attorney Patented Apr. 9, 1946

2,397,907

UNITED STATES PATENT OFFICE 2,397,907

ELECTRIC CIRCUIT CONTROLLER

Richard K. Akin, Chicago, Ill.

Application October 19, 1942, Serial No. 462,515

24 Claims. (Cl. 200—6)

This invention relates to improvements in electric circuit controllers and is particularly applicable to so-called drum controllers although not limited thereto.

Drum controllers are commonly employed for controlling electric motors and in many instances it is essential to interrupt power connections of the motor as an incident to changing from one set of operating connections to a different set of connections, and if the selecting contacts are used to interrupt the power connections they must be specially constructed for such duty, and in any event are subjected to very severe working conditions tending to shorten the life thereof.

The present invention has among its objects to provide an improved controller which may assume various forms including drum form and which without complication of manipulation will afford interruption of power connections as desired by suitable contacts other than the contacts used for selection of the different sets of connections desired for the motor or other translating device.

A further object is to provide such a controller wherein the contacts for selection of connections are furthermore relieved of the duty of making power connections, the latter connections being established by the additional contacts after the selecting contacts have been set as desired.

A further object is to provide a controller wherein all aforementioned contacts are under the control of a common operating member oscillatable in a single plane to effect selection of connections and also to effect making and breaking of power connections.

A further object is to provide a controller which when moved either away from or towards an off position will have the characteristics aforementioned.

A further object is to provide a controller having the aforementioned characteristics in operation thereof in either direction from an intermediate off position.

Other objects and advantages of the invention will hereinafter appear.

The accompanying drawings illustrate more or less schematically and diagrammatically certain embodiments of the invention which will now be described, it being understood that the embodiments illustrated are susceptible of various modifications without departing from the scope of the appended claims.

In the drawings,

Fig. 7 shows diagrammatically a contact arrangement and circuit connections for the device of Fig. 1 adapting it to control of a two-speed squirrel cage motor;

Figs. 8, 9, 10, 11 and 12 show schematically in different relations certain elements of the device of Fig. 1 modified for adaption to a controller affording an increased number of circuit commutations;

Fig. 13 shows diagrammatically a modification of the switch shown in Fig. 2 and also circuit connections for such modified switch, and Figs. 14 and 15 are schematic views showing the switch of Fig. 13 in different positions thereof.

Figure 1:
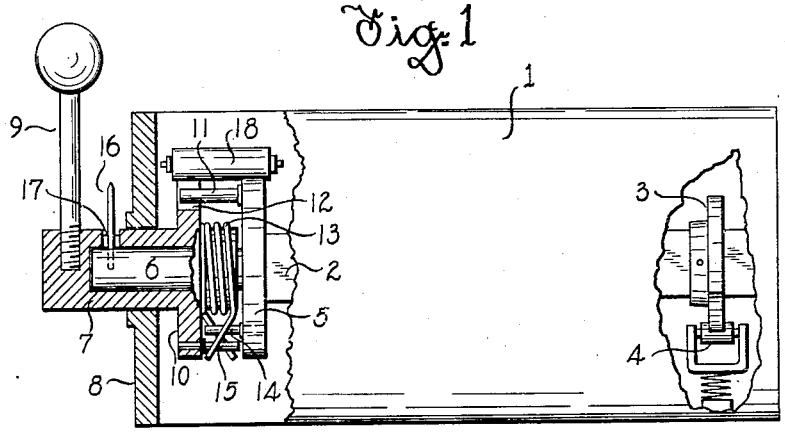
Figure 1 shows more or less schematically a drum type controller suitable for a two-speed squirrel cage motor.

Referring to Fig. 1 of the drawings, there is shown schematically a drum controller represented by housing 1 partly broken away and a rotating shaft 2 for operating the usual movable elements of the drum, such shaft to be suitably supported in the housing 1. The shaft 2 is shown as provided at its right hand end with a star wheel 3 and a cooperating spring pressed roller 4 to yieldingly hold the shaft in different predetermined rotary positions which of course vary with the design and use of the controller. As will later appear, the drum operating means selected for illustration is designed for a drum having two operating positions and an intermediate off position and thus the star wheel 3 may be assumed to be constructed to yieldingly hold the drum in each of such three positions.

The shaft 2 carries a disk 5 fixed thereto and said shaft to the left of said disk has a section 6 of reduced diameter fitting into a hollow shaft 7 rotatably mounted in an end wall 8 of the housing 1. The hollow shaft 7 has an operating handle 9 fixed to the outer end thereof and said hollow shaft carries a disk 10 fixed thereto in a parallel but spaced relation to the disk 5 on shaft 2. The disks 5 and 10 have a lost motion connection comprising a pin 11 carried by the disk 5 and projecting into a peripheral notch 12 in the disk 10. As will be understood, the disks 5 and 10 may be formed integrally with their respective shafts or may be formed separately and suitably attached thereto. As shown the hollow shaft 7 extends beyond disk 10 into proximity to the disk 5 and carries between said disks a coil spring 13 having its ends crossing to embrace pins 14 and 15 fixed to the disks 5 and 10, respectively.

Thus shafts 2 and 7 are biased into a given relation and assuming shaft 2 to be restrained by the star wheel 3 in off position movement of the handle 9 in either direction turns shaft 7 and disk 10 to tension spring 13 until pin 11 carried by disk 5 is engaged by a wall of the recess 12 of disk 10. Then continued movement of the handle in the same direction carries the disk 5 along with the disk 10 and positively drives the shaft 2. When the shaft 2 is driven to a position in which it is latched by the star wheel 3 release of the handle 9 will permit reverse movement of the disk 10 under the influence of the energy stored in the spring 13 until the disks 5 and 10 are restored to normal relation, the shaft 7 and handle 9 of course turning with the disk 10.

The extension 6 of shaft 2 preferably carries a pointer 16 extending through a slot 17 in the hollow shaft 7, which slot gives clearance to the pointer throughout the aforementioned relative movement of the disks 5 and 10. The pointer being fixed to the extension of shaft 2 of course indicates at all times the rotary position of the drum carried by shaft 2, and as will be apparent the housing may be marked to show through the medium of the pointer the circuit controlling position occupied by the drum.

Figure 2:
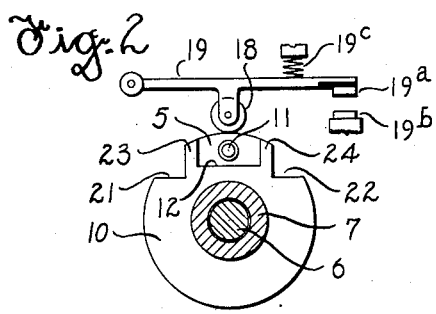
Fig. 2 is a further showing of certain features of the controller shown in Fig. 1.

Cooperating with the two disks 5 and 10 peripherally thereof is a roller 18 which as shown in Fig. 2 is carried by a pivoted arm 19 to be suitably supported within the housing 1, said arm carrying a contact 19a to cooperate with one or more stationary contacts 19b. It may be assumed that the contact 19a is insulated from the arm 19 and serves to bridge two contacts 19b. The arm 19 as shown tends to press the roller 18 against the disks and tends to engage the contacts 19a and 19b and if desired the arm may be provided with a spring 19c to supplement such natural tendencies of said arm.

As shown in Fig. 2, the two disks 10 and 5 are of the same diameter and are of like contour except that disk 5 is solid throughout its area corresponding to that of notch 12 of disk 10. Thus in Fig. 2 the disk 5 is invisible except for the aforementioned portion thereof, which is the portion carrying the pin 11. Each disk has to the left of pin 11 a notch 21, and to the right of said pin a notch 22, these notches in the disk 10 being spaced from the notch 12 to provide disk 10 with lugs 23 and 24, respectively, extending to the periphery of the disk. Each of the notches 21 and 22 is adapted to receive the roller 18 carried by the arm 19 and is of sufficient depth to permit said arm to drop for engagement of contacts 19a and 19b. Fig. 2 shows the disks 5 and 10 in normal relation wherein the notch 12 of disk 10 is directly beneath the roller 18, but the roller is held elevated for disengagement of contacts 19a and 19b by the solid portion of the disk 5 now registering with notch 12. Moreover Fig. 2 shows the disks 5 and 10 positioned for off position of the drum, in which position the drum is yieldingly held by the star wheel 3.

Figure 3:
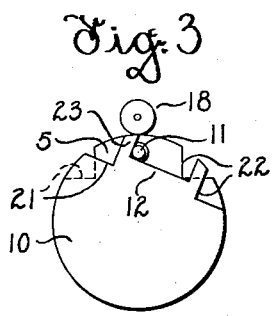
Figs. 3, 4, 5 and 6 are schematic views showing in different relations parts of the device of Fig. 1.
Figure 5:
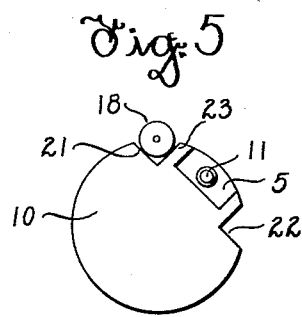
Figure 6:
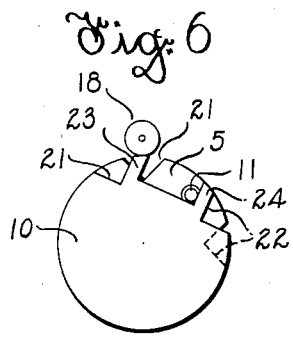

With the disks positioned as in Fig. 2, and assuming movement of the handle 9 clockwise, the disks first assume the relation shown in Fig. 3. The disk 5 remains stationary continuing the support of arm 19, while the disk 10 rotates to bring its lug 23 into engagement with the pin 11 on disk 5, the spring 13 meanwhile having been tensioned. Also meanwhile the notch 21 of disk 10 has been moved out of registering relation with the corresponding notch of disk 5, and continued clockwise movement of the handle 9 moves the disks together to the position shown in Fig. 4 during which movement the arm 19 is retained in elevated position first by the solid portion of disk 5 in register with the notch 21 of disk 10 and then by the solid portion of the disk 10 in register with the notch 21 of disk 5. Of course movement of the disk 5 represents corresponding movement of the shaft 2, and assuming the star wheel 3 to releasably hold the shaft 2 in the position to which it has been moved release of handle 9 will allow spring 13 to restore disk 10 to normal relation with disk 5, as shown in Fig. 5, again registering the notches 21. The notch 21 being now directly below the roller 18 said roller will enter such notches, permitting the arm 19 to lower for engagement of contacts 19a and 19b. Then assuming the parts to be in the relation shown in Fig. 5, manual operation of the handle 9 in counterclockwise direction will first effect independent movement of disk 10 to lift roller 18 by forcing thereunder lug 23 of disk 10 as shown in Fig. 6. Meanwhile the lug 24 of disk 10 has engaged pin 11 on disk 5 whereby continued counterclockwise movement of handle 9 will move the two disks together, the lug 23 of disk 10 holding the roller 18 and arm 19 raised until a solid portion of the disk 5 underlies the roller 18 to prevent dropping thereof. Then when the handle has been moved sufficiently far to return the drum to off position for latching thereof by the star wheel release of the handle will permit spring 13 to restore the parts to the relation shown in Fig. 2.

Upon operation of the handle counterclockwise when the drum is in off position the disks 5 and 10 will similarly control switch contacts 19a and 19b through the medium of arm 19 and roller 18, but in this instance the pin 11 on the disk 5 will coact with the other lug on the disk 10 and the two notches 22 will ultimately be brought beneath the roller 18 upon latching of the shaft by the star wheel 3 and release of the handle 9. Then manual return movement of the handle 9 will cause the disks to coact in a manner similar to that previously described to lift the roller 18 and arm 19 for disengagement of contacts 19a and 19b.

Thus it will be apparent that shaft 2 may be utilized for operation of a suitably designed drum section for merely selecting circuits and that the switch comprising arm 19 and contacts 19a and 19b may be utilized for control of power connections in a manner such that power connections will be interrupted prior to shifting of the drum contacts and will be established only after the drum contacts have been moved into the desired relation. Fig. 7 exemplifies one application of the mechanism described wherein the selective contacts are thus advantageously relieved of duty either to break or to make power connections.

Referring to Fig. 7, the same shows the controller used to control a motor M of the two speed squirrel cage type having terminals $T^1$, $T^2$ and $T^3$ to be connected in circuit for one speed, and terminals $T^4$, $T^5$ and $T^6$ to be connected in circuit for a different speed, the terminals $T^1$, $T^2$ and $T^3$ being then interconnected. The motor is supplied from lines $L^1$, $L^2$ and $L^3$, the connection to lines $L^1$ and $L^2$ being dependent upon a double-pole electroresponsive switch S having its energizing circuit controlled by the aforementioned contacts 19ª and 19ᵇ of the controller.

The selection contacts for the drum comprise a series of stationary contacts 25, 26, 27, 28 and 29, and a second series of stationary contacts 30, 31, 32, 33 and 34. The contacts 31, 32 and 33 are respectively connected to motor terminals T¹, T² and T³, contacts 33 and 34 being interconnected. Contacts 26, 28 and 25 are respectively connected to motor terminals T⁴, T⁵ and T⁶. Contact 30 is connected to line L¹ through one pole of switch S, while contact 27 is connected to line L² through the other pole of said switch, contact 29 having a permanent connection to line L³. Also the selection contacts comprise two sets of segments to coact with the stationary contacts according to direction of movement of the controller handle 9 from its intermediate off position. Assuming movement of the handle counterclockwise, a segment 35 bridges contacts 30 and 31 to connect motor terminal T¹ to line L¹ when switch S is closed, while interconnected segments 36 and 37 bridge contacts 32 and 27 to connect motor terminal T² to line L² when switch S is closed. Additionally interconnected segments 38 and 39 bridge contacts 34 and 29 to connect motor terminal T³ directly to line L³. Switch contacts 19ª and 19ᵇ as aforedescribed do not engage until after movement of the controller handle to effect engagement of the contacts and segments as just described and until the handle is released, whereupon the contacts 19ª and 19ᵇ engage to connect the winding of switch S across lines L¹, L², causing switch S to respond and to complete the power connections just described. On the other hand, movement of the controller handle to off position as previously explained effects disengagement of contacts 19ª and 19ᵇ prior to initiating movement of the drum segments, wherefore switch S will be deenergized to interrupt power connections of the motor in advance of movement of the drum segments. Further referring to the arrangement of selection contacts when the controller handle is moved from off position in a clockwise direction, a segment 40 bridges contacts 26 and 27 to connect motor terminal T⁴ to line L² when switch S is closed, and a segment 41 bridges contacts 28 and 29 to connect motor terminal T⁵ directly to line L³, while interconnected segments 42 and 43 bridge contacts 30 and 25 to connect motor terminal T⁶ to line L¹ when switch S is closed. Additionally a segment 44 bridges contacts 31, 32 and 33 to interconnect the motor terminals T¹, T² and T³. Here again, as will be apparent from the earlier description, the switch S under control of the controller contacts 19ª and 19ᵇ relieves the selection contacts of duty either as making or breaking contacts for power connections.

Whereas Fig. 7 shows the controller contacts 19ª and 19ᵇ as controlling power connections through the medium of an electroresponsive switch S it is to be understood that contacts suitable for direct control of power connections may be substituted for the contacts 19ª and 19ᵇ, thus dispensing with the electroresponsive switch.

Referring to Figs. 8 to 12, the same show modified disks 50 and 51 corresponding to disks 5 and 10, respectively, of Fig. 1, these modified disks adapting the controller to selection of a greater number of sets of operating connections. The disks of Figs. 8 to 12 provide for three operating positions of the drum or other type of selector switch and in this instance such three positions call for operation of the handle in a clockwise direction from an extreme rather than an intermediate off position. However, it will be apparent from the disclosure of Figs. 8 to 12 considered in the light of disclosure of Figs. 1 to 6, that the disks may be readily designed to afford a plurality of circuit selecting positions to either side of an intermediate off position.

As will appear from Fig. 8, the disks 50 and 51 are of the same diameter and identical in contour except for the notch 12 in disk 51 which is like the notch 12 in disk 10 of Figs. 1 to 6 and the disk 50 like the disk 5 of Figs. 1 to 6 has a pin 11 projecting into slot 12. Each disk 50 and 51 has therein notches 52, 53 and 54 to receive the roller 18, and in disk 51 the notches 12 and 52 are spaced to provide a lug 55 therebetween similar to the lug 23 of disk 10 of Figs. 1 to 6.

Figure 4:
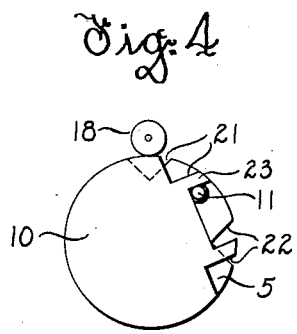

Assuming movement of the controller handle 9 clockwise, and assuming the disk 50 to be restrained by a star wheel as in Fig. 1, the disks will first be brought into the relation shown in Fig. 9 and then the disks will be moved together first to the position shown in Fig. 10. Thus far there is no difference between the operation and action of disks 50 and 51 and the operation and action of disks 5 and 10 as depicted in Figs. 3 and 4 to which Figs. 9 and 10 correspond, the disks 50 and 51 having blocked fall of the roller during movement to the position depicted in Fig. 10. With the disks 50 and 51 in the position depicted in Fig. 10 the controller will be in a circuit selecting position and line connections may now be established by releasing the handle 9 for spring return movement to register the notch 52 of disk 51 with notch 52 of disk 50, as depicted in the case of disks 5 and 10 in Fig. 5. On the other hand, the controller may be moved to its next operating position or to its last operating position before releasing the roller 18 to effect line connection. Thus with the disks in the relation shown in Fig. 10, clockwise movement of the handle 9 may be continued for movement of the disks to the position shown in Fig. 11 throughout which movement the roller 18 is retained in elevated position by the substantially continuous bearing surface afforded by the disks jointly due to the early relative movement of the disks to bring each notch of each disk in register with a solid portion of the other disk. When the disks are in the position shown in Fig. 11 the controller is in final position with the notch 54 of disk 50 directly beneath roller 18, and upon release of the controller handle disk 51 will move to register its notch 54 with notch 54 of disk 50, as depicted in Fig. 12, to permit fall of roller 18, with consequent establishment of line connections. As will be obvious, line connections might have been established in the second circuit selecting position by merely releasing the controller handle when the disk 50 occupied an angular position, bringing its notch 53 directly below the roller 18. Also it will be obvious that with the controller in any operating position the line connections therefor after establishment thereof may be interrupted at any time by a movement of the controller handle in either direction to shift disk 51 relative to disk 50, thereby forcing the roller 18 out of the notches occupied thereby, after which the controller may be moved to off position or to another operating position, meanwhile preventing re-establishment of line connections, assuming that the movement of the handle to first break line connections was in a direction to be continued for movement of the controller to off position or other operating position selected.

In practice it may be desired to provide the controller with means whereby if power fails the controlled motor or other translating device will be disconnected from the power line pending a manual operation of the controller, and Fig. 13 shows a modification of the controller to afford such protection. Referring to Fig. 13, the same shows the arm 19 employed to control an electroresponsive line switch S as in Fig. 7, but in this instance the control of the switch S afforded by the arm is different. The arm 19 in this instance has associated therewith a spring contact 56 engaged by a contact portion of said arm when in lifted position and adapted to move with said arm when lowered to engage its said contact portion with additional spring contacts 57 and 58 as shown in Fig. 14. The arm 19 engages both contacts when said arm is in an intermediate position and when in its lowermost position it disengages spring contact 56, remaining in engagement with spring contacts 57 and 58, as shown in Fig. 15. When the arm engages and bridges contacts 56 and 57 it completes a circuit from line L¹ to and through the winding of switch S to line L², completion of this circuit effecting response of switch S. However, this circuit is interrupted when arm 19 disengages contact 56, but at this time contacts 57 and 58 are engaged and bridged by arm 19 to complete a maintaining circuit for the winding of switch S. This maintaining circuit extends from line L¹ to and through auxiliary contacts S¹ of switch S, to and through the now bridged contacts 58 and 57, to the winding of switch S. As will be understood, switch S opens upon failure of power and in opening it disengages its auxiliary contacts S¹ to interrupt the maintaining circuit of its operating winding. Thus before switch S can reclose the arm 19 must be operated to bridge contacts 57 and 56, this requiring a manual operation of the controller handle. However, it is only necessary to move the controller handle to lift and lower the roller 18 so that reclosure of switch S is made possible without changing the position of the controller drum.

While the controller illustrated provides for spring biasing of the disks 5 and 19 into a given relation, it will be apparent that spring bias is not essential and that the required reverse movement of the handle after the drum has been positioned as desired could be effected manually.

What I claim as new and desire to secure by Letters Patent is:

1. In a circuit controller, in combination, a circuit controlling device having different operating positions, a separately operable switch to control line connection of said device and mechanical operating means for said device and said switch affording a control handle common thereto, said means in response to movements of said handle in a single plane effecting operations of said switch and changes in position of said device and insuring line disconnection of said device through the medium of said switch prior to each change in position of said device by said handle, and said means including means rendering operation of said switch to establish line connection of said device dependent upon full movement of said device into one or another of the aforementioned operating positions and enabling said device to be optionally moved by said handle to or through operating positions while maintaining line disconnection through the medium of said switch.

2. In a circuit controller, in combination, a movable circuit controlling device, a separately operable switch to control line connection of said device and mechanical operating means for said device and said switch affording a control handle common thereto, said means in response to unidirectional movements of said handle in a single plane and in either a forward or reverse direction effecting operations of said device and said switch individually and including means to insure line disconnection of said device through the medium of said switch prior to and throughout each movement of said device by said handle in either direction or through any part of the full range of movement of said device and enabling control of said switch by said handle for reestablishment of line connection in any one of a number of positions of rest of said device.

3. In a circuit controller, in combination, a circuit selecting device movable in opposite directions from an intermediate off position, a separately operable switch to control line connection of said device and mechanical operating means for said device and said switch affording a control handle common thereto, said means in response to movement of said handle in a single plane effecting operations of said device and said switch individually and movement of said device to either side of its off position, said means including means insuring line disconnection of said device through the medium of said switch prior to and throughout each movement of said device by said handle, and in each circuit selecting position of said device rendering said switch operative under control of said handle to effect line connection of said device but only upon a movement of said handle in a direction reverse to that by which said device has been brought to the selected position.

4. In a circuit controller, in combination, a circuit selecting device having an off position, a separately operable switch to control line connection of said device and mechanical operating means for said device and said switch affording in common thereto a handle having an off position, said means effecting through the medium of said switch line disconnection of said device when said device and said handle are in their respective off positions and effecting in response to movement of said handle in a given plane away from off position movement of said device to a circuit selecting position and said means including means then to effect in response to a partial return movement of said handle in the same plane operation of said switch to establish line connections for said device.

5. In a circuit controller, in combination, a movable circuit controlling device, a separately operable switch to control line connection of said device, a common operating handle for said device and said switch, and operating connections affording by movements of said handle in a single plane movements of said device and said switch individually, insuring line disconnection of said device through the medium of said switch prior to and throughout each movement of said device by said handle, said connections including means affording a limited lost motion between said handle and said device and including means rendering said switch operable for line connection and disconnection by reverse movements of said handle within the range of the aforementioned lost motion and rendering line connection by said switch subject to delay pending movement of said device from its position of rest optionally to any one of a number of selected positions.

6. In a circuit controller, in combination, a circuit selecting device, a separately operable switch to control line connection of said device, a common operating handle for said device and said switch, and operating connections affording by movements of said handle in a single plane movements of said device and said switch individually, insuring line disconnection of said device through the medium of said switch prior to and throughout each movement of said device by said handle, said connections including means affording lost motion between said handle and said device and having energy storing means opposing takeup of such lost motion and said connections including means subjecting said switch to a given setting by said handle when moved to take up the aforementioned lost motion and to a different setting under the influence of said energy storing means when said handle is released with said device in a circuit selecting position.

7. In a circuit controller, in combination, a circuit selecting device movable in opposite directions from an intermediate off position, a separately operable switch to control line connection of said device, a common operating handle for said device and said switch, and operating connections affording by movements of said handle in a single plane movements of said device and said switch individually, insuring line disconnection of said device through the medium of said switch prior to and throughout each movement of said device by said handle, said connections including means affording lost motion between said handle and said device and including means to effect setting of said switch for line disconnection when said device is in off position while in all circuit selecting positions of said device subjecting said switch to reverse operations by reverse movements of said handle within the range of the aforementioned lost motion and always necessitating for line connection by said switch a movement of said handle in a reverse direction to that by which said device has been brought to its selected position.

8. In a circuit controller, in combination, a circuit selecting device movable in opposite directions from an intermediate off position, a separately operable switch to control line connection of said device, a common operating handle for said device and said switch, and operating connections affording by movements of said handle in a single plane movements of said device and said switch individually and movements of said device to either side of its off position, insuring line disconnection of said device through the medium of said switch prior to and throughout each movement of said device by said handle, said connections including means affording lost motion between said handle and said device and biasing said handle and said device into a relation affording a range of lost motion upon movement of said handle in either direction out of such relation, and said connections including means to render said switch operable for line connection and disconnection by reverse movements of said handle within either aforementioned range of lost motion.

9. In a circuit controller, in combination, a rotatable circuit selecting device, a separately operable switch to control line connection of said device, a control handle common to said device and said switch and movable about an axis aligned with the axis of rotation of said device, and operating connections affording by movements of said handle about its axis and in a single plane movements of said switch and said device selectively and movements of each to different positions selectively, said connections comprising parts which are interconnected for limited relative movement and which if in a given relation are subjected to relative motion incidental to and prior to each movement of said device by said handle, said parts when subject to such relative motion acting on said switch to effect line disconnection pending return of said parts into said given relation and then only when said device occupies one or another of a number of predetermined circuit selecting positions.

10. In a circuit controller, in combination, a rotatable circuit selecting device, a separately operable switch to control line connection of said device, a control handle common to said device and said switch and movable about an axis aligned with the axis of rotation of said device, and operating connections affording by movements of said handle about its axis and in a single plane movements of said switch and said device selectively and movements of each to different positions selectively, said connections comprising relatively movable parts biased into a given relation subject to relative movement into a different relation as an incident to and prior to each movement of said device by said handle, said parts when subjected to the aforementioned change in relation acting on said switch to effect line disconnection pending return of said parts to said given relation and then only when said device occupies one or another of predetermined circuit selecting positions.

11. In a circuit controller, in combination, a rotatable circuit selecting device, a separately operable switch to control line connection of said device, a control handle common to said device and said switch and movable about an axis aligned with the axis of rotation of said device, and operating connections affording by movements of said handle about its axis and in a single plane movements of said switch and said device selectively and movements of each to different positions selectively, said connections comprising a lost motion connection between said handle and said device and notched elements respectively associated with said device and said handle jointly to control said switch, said handle being movable within the range of the aforementioned lost motion to move its notched element out of registry with the other notched element to set said switch for line disconnection and to return its notched element into registry with the other notched element for setting of said switch for line connection but only if said device occupies a circuit selecting position.

12. In a circuit controller, in combination, a rotatable circuit selecting device, a separately operable switch to control line connection of said device, a control handle common to said device and said switch and movable about an axis aligned with the axis of rotation of said device, and operating connections affording by movements of said handle about its axis and in a single plane movements of said switch and said device selectively and movements of each to different positions selectively, said connections comprising a lost motion connection between said handle and said device and notched elements respectively associated with said device and said handle jointly to control said switch, said handle being movable within the range of the aforementioned lost motion to move its notched element out of registry with the other notched element to set said switch for line disconnection and to return its notched element into registry with the other notched element for setting of said switch for line connection but only if said device occupies a circuit selecting position, and said connections affording with all aforementioned operating characteristics and through the medium of said handle movements of said device to either side of an intermediate off position.

13. In an operating mechanism for drum controllers and the like, in combination, a rotatably supported shaft, carrying contacts, a handle for rotating said shaft, a pair of auxiliary switches, means effective upon rotation of said handle to effect opening of one of said pair and closing of the other of said pair prior to rotation of said shaft by said handle, to maintain said pair in aforementioned position during unidirectional rotation of said shaft, and to reverse position of said pair after rotation of said shaft has ceased.

14. In an operating mechanism for drum controllers, a rotatable power contact carrying shaft, a first and a second auxiliary contact, a handle mounted on said shaft, means for closing said first auxiliary contact, and for subsequently opening said second auxiliary contact by initial rotary movement of said handle, in either direction, means for rotating said shaft by further rotary movement of said handle, and means for operating said auxiliary contacts in reverse order by reverse movement of said handle, prior to imparting reverse motion to said shaft.

15. In a circuit controller, in combination, a movable circuit controlling device, a separately operable switch to control line connection of said device, a common operating handle for said device and said switch, lost motion means between said device and said switch, and operating connections affording by movements of said handle in a single plane, movements of said device and said switch individually, insuring line disconnection of said device through the medium of said switch prior to movement of said device by said handle to open circuit position, and including means rendering said switch operable for line connection and disconnection by reverse movements of said handle within the range of the aforementioned lost motion.

16. In combination, circuit controlling means having various circuit controlling positions, a separately operable switch for line connection control thereof, operating means for said circuit controlling means and said switch comprising a common operating handle for both, and further comprising lost motion connections and other connections affording by movements of said handle in a single plane first in one direction and then in an opposite direction, operation of said circuit controlling means progressively through circuit controlling positions to a given position while maintaining said switch open and then closing said switch by reverse movement of said handle within the limits of the aforementioned lost motion.

17. In a controller for an electric motor having a plurality of windings, in combination, a shaft, means for connecting said windings to a source of power in different relationships as said shaft is rotated, and associated means for reducing the destructive effects of arcing incident to establishing circuit connections, said latter means comprising a pair of coaxially mounted similarly notched wheels, lost motion means between said wheels, follower means held in one position when notches in both wheels are in registry and in another position when said notches are not in registry, and means actuated by said follower means to disconnect said motor and to keep said motor disconnected from said source, when said shaft is rotated until said notches are returned to registry.

18. In a controller for an electric motor, in combination, a shaft, means operated by said shaft to establish different circuit connections for said motor as said shaft is rotated, and means for controlling line connection of the first mentioned means to reduce the destructive effects of arcing incident to establishing the connections afforded by the first mentioned means, the second mentioned means comprising a pair of coaxially mounted similarly notched wheels having a lost motion connection, follower means held in one position when the notches in both wheels are in registry and in another position when said notches are not in registry and a handle connected to one of said wheels and afforded by said wheels lost motion connection with said shaft to effect operation of the first mentioned means for circuit change with said wheels in a relation to hold said follower in one position and said handle then by a relatively small reverse movement effecting change of the relation of said wheels to permit said follower to assume a different position.

19. In a circuit controller, a pair of coaxially mounted similarly notched wheels, lost motion driving means between said wheels, follower means held in one position when notches of both wheels are in registry and in another position when said notches are not in registry, and means actuated by said follower means to open circuit when said follower means is in one position and to close circuit when said follower means is in the other position, the angle of lost motion between said wheels being greater than one-half the width of said notches.

20. In a circuit controller, a pair of coaxially mounted notched wheels, a rotatable shaft, the first of said wheels being driven by said shaft, the second of said wheels being driven through lost motion means from said first wheel, follower means and means actuated by said follower means for opening and closing the circuit, the angle of lost motion between said wheels and the shape and size of the notches in said wheels being so correlated that said follower means keeps said opening and closing means in its open position during rotation of said shaft continuously in one direction and moves said opening and closing means to its closed position when said shaft is moved through a limited angle in the opposite direction.

21. In a circuit controller, a pair of coaxially mounted notched wheels, a rotatable shaft by which one of said wheels is driven, a lost motion driving connection between said wheels, follower means engaging said notched wheels, and means actuated by said follower means for opening and closing a circuit, said notched wheels when in a given relation effecting positioning of said follower means for interruption of circuit and being rotatable in said given relation through a relatively wide angle by rotation of said shaft in one direction through a relatively wide angle, and said shaft thereupon being rotatable in a reverse direction through a relatively small angle to change the relation of said wheels to effect change of the position of said follower for circuit closing.

22. In a circuit controller, cooperating contacts, a control element for certain of said contacts, a notched wheel connected to said element to be moved thereby in opposite directions selectively, a second similarly notched wheel having a lost motion connection with the former wheel and follower means coacting with said notched wheels and operatively connected to said certain of said contacts, said wheels in a given relation and in a given rotary position permitting said follower means to enter notches in said wheels to effect a change in relation of said cooperating contacts, and said wheels when moved by said element in either direction toward said given rotary position assuming a relation to close the aforementioned notches to said follower means pending arrest of said second wheel in said given rotary position and pending reverse movement of the first mentioned wheel for restoring said wheels to said given relation.

23. In a circuit controller, cooperating contacts, a manual control element for certain of said contacts, a notched wheel connected to said element to be moved thereby in opposite directions selectively, a second similarly notched wheel having a lost motion connection with the former wheel and follower means coacting with said notched wheels and operatively connected to said certain of said contacts, said wheels in a given relation and in a given rotary position permitting said follower means to enter notches in said wheels to effect a change in relation of said cooperating contacts, and said wheels when moved by said element in either direction toward said given rotary position assuming a relation to close the aforementioned notches to said follower means pending arrest of said second wheel in said given rotary position and pending reverse movement of the first mentioned wheel for restoring said wheels to said given relation, and means to effect automatically such reverse movement of said first mentioned wheel when released through release of said control element.

24. In a controller for a motor having a plurality of windings to be connected in circuit selectively, in combination, circuit controlling means for the motor windings to disconnect all of the selective windings from circuit, or alternatively to establish power connections therefor and to insure against simultaneous connection of windings to be connected selectively, an operating element and operative connections between said element and said means, said connections comprising notched wheels interconnected to permit limited relative rotation thereof, and said connection further comprising means which when said wheels are in a given relation and in given rotary positions effect connection by said means of the motor windings as selected by the position of said element and which upon movement of said wheels out of such relation by initial movements of said element effect disconnection of all of the selective windings pending arrest and reverse movement of said element into its nearest position of selection regardless of prior movement of said element through other positions of selection.

RICHARD K. AKIN.